United States Patent
Saito et al.

(10) Patent No.: US 8,163,198 B2
(45) Date of Patent: Apr. 24, 2012

(54) PROCESS FOR PRODUCING LITHIUM-CONTAINING COMPOSITE OXIDE FOR POSITIVE ELECTRODE OF LITHIUM SECONDARY BATTERY

(75) Inventors: Naoshi Saito, Chigasaki (JP); Takeshi Kawasato, Chigasaki (JP); Tokumitsu Kato, Chigasaki (JP); Kazushige Horichi, Chigasaki (JP)

(73) Assignee: AGC Seimi Chemical Co., Ltd., Chigasaki (JP)

( * ) Notice: Subject to any disclaimer, the term of this patent is extended or adjusted under 35 U.S.C. 154(b) by 0 days.

(21) Appl. No.: 11/940,689

(22) Filed: Nov. 15, 2007

(65) Prior Publication Data

US 2008/0135802 A1 Jun. 12, 2008

Related U.S. Application Data

(63) Continuation of application No. PCT/JP2006/309850, filed on May 17, 2006.

(30) Foreign Application Priority Data

May 17, 2005 (JP) ................................. 2005-144513

(51) Int. Cl.
    $H01M \ 4/88$ (2006.01)
(52) U.S. Cl. .................. 252/182.1; 252/500; 252/518.1; 252/519.1; 429/220; 429/223; 429/231.1; 429/231.5; 429/231.9; 429/464
(58) Field of Classification Search ............... 252/182.1, 252/500, 521.2, 518.1, 519.1; 427/126.1, 427/126.3; 429/231.3, 231.95, 128, 223, 429/224, 231.1, 220, 231.5, 231.9, 464; 423/594.6; 424/489
See application file for complete search history.

(56) References Cited

U.S. PATENT DOCUMENTS

| | | | |
|---|---|---|---|
| 5,742,070 A * | 4/1998 | Hayashi et al. ............. 252/182.1 |
| 6,015,637 A * | 1/2000 | Mitate et al. ................ 429/231.1 |
| 6,103,421 A * | 8/2000 | Torata et al. ................... 429/223 |
| 6,344,294 B1 * | 2/2002 | Torata et al. ................... 429/223 |
| 6,368,750 B1 * | 4/2002 | Nemoto et al. ........... 429/231.95 |
| 6,617,073 B1 * | 9/2003 | Matsumoto et al. ........ 429/231.3 |
| 6,756,155 B1 * | 6/2004 | Kweon et al. ............ 429/231.95 |
| 6,902,745 B2 * | 6/2005 | Lee et al. ........................ 424/489 |
| 7,008,608 B2 * | 3/2006 | Park et al. ................... 423/594.6 |
| 7,192,672 B2 * | 3/2007 | Horichi et al. ................. 429/128 |
| 7,481,991 B2 * | 1/2009 | Kawasato et al. .......... 423/594.6 |
| 2001/0031311 A1 * | 10/2001 | Lee et al. .................... 427/126.3 |
| 2003/0205700 A1 * | 11/2003 | Gao et al. ....................... 252/500 |
| 2003/0211235 A1 * | 11/2003 | Suh et al. .................... 427/126.1 |
| 2005/0021645 A1 | 1/2005 | Kulkarni et al. |
| 2005/0034299 A1 * | 2/2005 | Kurihara et al. ............. 29/623.5 |
| 2006/0154146 A1 | 7/2006 | Kawasato et al. |
| 2006/0210879 A1 | 9/2006 | Kawasato et al. |
| 2006/0246352 A1 * | 11/2006 | Kweon et al. ............ 429/231.95 |
| 2007/0026314 A1 | 2/2007 | Kawasato et al. |
| 2007/0298324 A1 | 12/2007 | Kawasato et al. |

FOREIGN PATENT DOCUMENTS

| | | | |
|---|---|---|---|
| JP | 5-242891 | | 9/1993 |
| JP | 06-163046 | * | 6/1994 |
| JP | 07-142065 | * | 6/1995 |
| JP | 09-050811 | | 2/1997 |
| JP | 11-067205 | * | 3/1999 |
| JP | 2002-198051 | | 7/2002 |
| JP | 2003-272628 | | 9/2003 |
| JP | 2004-220897 | | 8/2004 |
| WO | 2004-051771 | | 6/2004 |
| WO | 2004-088776 | | 10/2004 |

OTHER PUBLICATIONS

U.S. Appl. No. 11/942,208, filed Nov. 19, 2007, Saito et al.

* cited by examiner

*Primary Examiner* — Khanh Tuan Nguyen
(74) *Attorney, Agent, or Firm* — Oblon, Spivak, McClelland, Maier & Neustadt, L.L.P.

(57) ABSTRACT

A process for producing a lithium-containing composite oxide having a large volume capacity density, high safety, excellent durability for charge/discharge cycles, and excellent low temperature characteristics. An oxide of general formula $Li_pN_xM_yO_zF_a$ (wherein N is at least one of Co, Mn or Ni, M is at least one of Al, an alkali earth metal element, a transition metal element other than N, $0.9 \leq p \leq 1.2$, $0.97 \leq x \leq 1.00$, $0 \leq y \leq 0.03$, $1.9 \leq z \leq 2.2$, $x+y=1$ and $0 \leq a \leq 0.02$) can be produced.

26 Claims, No Drawings

PROCESS FOR PRODUCING LITHIUM-CONTAINING COMPOSITE OXIDE FOR POSITIVE ELECTRODE OF LITHIUM SECONDARY BATTERY

CROSS REFERENCE TO RELATED APPLICATION

This application is a continuation of PCT/JP06/309850, filed on May 17, 2006, and claims priority to Japanese Patent Application No. 2005-144513, filed on May 17, 2005.

TECHNICAL FIELD

The present invention relates to a process for producing lithium-containing composite oxide for a positive electrode of lithium secondary battery, which has a large volume capacity density, high safety, excellent durability for charge/discharge cycles, high press-density and high productivity; a positive electrode for lithium secondary battery containing the produced lithium-containing composite oxide; and a lithium secondary battery.

BACKGROUND ART

In recent years, along with the progress in portable or codeless equipments, a demand is mounting for a non-aqueous electrolyte secondary battery which is small in size and light in weight and has a high energy density. As an active material for a non-aqueous electrolyte secondary battery, a composite oxide of lithium and a transition metal, such as $LiCoO_2$, $LiNiO_2$, $LiNi_{0.8}Co_{0.2}O_2$, $LiMn_2O_4$ or $LiMnO_2$, has been known.

Especially, a lithium secondary battery employing a lithium-cobalt composite oxide ($LiCoO_2$) as a cathode active material and employing a lithium alloy or a carbon such as graphite or carbon fiber as a negative electrode, provides a high voltage at a level of 4 V and is widely used as a battery having a high energy density.

However, in a case of the non-aqueous type secondary battery employing $LiCoO_2$ as a cathode active material, further improvements of capacity density per a unit volume of a positive electrode layer and safety, have been desired, and there have been such problems as a problem of deterioration of cyclic properties that the battery discharge capacity gradually decreases as a charge/discharge cycle is repeated, a problem of weight capacity density, or a problem that the decrease of discharge capacity is significant at a low temperature.

In order to solve these problems, Patent Document 1 reports stabilization of crystal lattice of lithium-cobalt composite oxide and improvement of performances by substituting a part of cobalt element by elements such as manganese or copper by a so-called solid phase method in which raw material components are blended and fired in a state of solid phase. However, in this solid phase method, it was confirmed that although cyclic properties can be improved by the effect of the substituting elements, the thickness of the battery gradually increases as the charge/discharge cycle is repeated.

Further, Patent Document 2 reports improvement of performances of lithium-cobalt composite oxide by substituting a part of cobalt element by an element such as magnesium by a coprecipitation method. However, in this coprecipitation method, although more uniform substitution of element is possible, there are problems that the type or the concentration of substituting elements is limited and it is difficult to obtain a lithium-cobalt composite oxide having expected performances.

The present inventors discovered earlier that e.g. a lithium-cobalt composite oxide employing a raw material obtainable by a method of impregnating a solution containing a metal such as aluminum, magnesium or zirconium and containing a carboxylic acid and/or hydroxyl group, into a raw material powder of a compound of a transition metal such as cobalt, has excellent electrode performances of lithium secondary battery, and they proposed this method in Patent Document 3. However, it has become clear that e.g. a lithium-cobalt composite oxide obtained by such a method, has the above-mentioned high-performance electrode characteristics when they are produced in a small-sized lot, but when they are produced in an industrial production size, there occurs a problem that a lithium-cobalt composite oxide obtained does not exhibit sufficient performance of an electrode, and there is a problem in productivity at a time of mass production.

Patent Document 1: JP-A-5-242891
Patent Document 2: JP-A-2002-198051
Patent Document 3: WO2004/088776

DISCLOSURE OF THE INVENTION

Problems to be Solved by the Invention

It is an object of the present invention to provide a process for producing a lithium-containing composite oxide such as a lithium-cobalt composite oxide for a positive electrode of lithium secondary battery, having a large volume capacity density, high safety, excellent durability for charge/discharge cycles and excellent low-temperature characteristics, by substituting an element such as cobalt in a lithium-cobalt composite oxide by various types of substituting elements, which is suitable for mass production.

Means of Solving the Problems

In order to solve the above problems, the present inventors have conducted extensive studies and as a result, they have discovered that in a case of substituting an element to be substituted such as cobalt in e.g. a lithium-containing composite oxide by a substituting element such as aluminum, magnesium or zirconium, by using specific means, the element to be substituted is uniformly substituted by the substituting element and high packing property is thereby maintained, and by firing the material under specific conditions, a lithium-cobalt composite oxide such as a lithium-cobalt composite oxide whose properties are improved, is produced with good productivity. Here, the above-mentioned element to be substituted means specifically at least one type of element selected from the group consisting of Co, Mn and Ni, which may be referred to as N element hereinafter. Further, the above-mentioned substituting element means specifically at least one type of element selected from the group consisting of Al, an alkali earth metal element and a transition metal element other than N, which may be referred to as M element hereinafter.

According to the present invention, as compared with the above-mentioned conventional solid phase method, an N element being an element to be substituted is substituted by various types of M elements being substituting elements uniformly at various types of concentrations, and thus, M element being a substituting element is uniformly present in a lithium-containing composite oxide obtained, whereby an expected effect can be obtained. Further, in the present invention, there is no restriction in the type or the concentration of substituting M element differently from the above-mentioned conventional coprecipitation method, and various types of elements can be used as M elements at appropriate concentrations. For this reason, the lithium-containing composite oxide obtainable by the present invention has excellent performances of a positive electrode of lithium secondary battery in terms of all of volume capacity density, safety, durability for charge/discharge cycles, press density and productivity.

The present invention has the following gists:

(1) A process for producing a lithium-containing composite oxide represented by a general formula $Li_pN_xM_yO_zF_a$ (wherein N is at least one type of element selected from the group consisting of Co, Mn and Ni, M is at least one type of element selected from the group consisting of Al, an alkali earth metal element and a transition metal element other than N, $0.9 \leq p \leq 1.2$, $0.97 \leq x < 1.00$, $0 < y \leq 0.03$, $1.9 \leq z \leq 2.2$, x+y=1 and $0 \leq a \leq 0.02$), the process comprising a step of firing a blended product containing a lithium source, an N element source, an M element source and, as the case requires, a fluorine source in an oxygen-containing atmosphere;

wherein as the N element source and the M element source, a product produced by impregnating a solution containing the M element source into a powder containing the N element source and drying them, is employed, and as the above firing, a first-stage firing at from 250 to 700° C. is applied and a second-stage firing at from 850 to 1,100° C. is subsequently applied to the fired product of the first-stage firing.

(2) The process for producing a lithium-containing composite oxide according to the above (1), wherein the fired product of the first-stage firing is not pulverized before it is subjected to subsequent second-stage firing.

(3) A process for producing a lithium-containing a composite oxide represented by a general formula $Li_pN_xM_yO_zF_a$ (wherein N is at least one type of element selected from the group consisting of Co, Mn and Ni, M is at least one type of element selected from the group consisting of Al, an alkali earth metal element and a transition metal element other than N, $0.9 \leq p \leq 1.2$, $0.97 \leq x \leq 1.00$, $0 < y \leq 0.03$, $1.9 \leq z \leq 2.2$, x+y=1 and $0 \leq a \leq 0.02$), the process comprising a step of firing a blended product containing a lithium source, an N element source, an M element source and as the case requires, a fluorine source in an oxygen-containing atmosphere;

wherein as the N element source and the M element source, a product produced by impregnating a solution containing the M element source into a powder containing the N element source and drying them, is employed, and in the above firing, the temperature is raised from 250 to 600° C. at a temperature-rising speed of at most 4° C./min and the firing is carried out at from 850 to 1,100° C.

(4) The process according to any one of the above (1) to (3), wherein the solution containing the M element source is a solution containing a compound having at least two carboxylic group(s) or hydroxyl group(s) in total in its molecule.

(5) The process according to any one of the above (1) to (4), wherein in the dried product the content of the compound having at least two carboxylic group(s) or hydroxyl group(s) in total in its molecule is from 0.1 to 10 wt %.

(6) The process according to any one of the above (1) to (5), wherein the dried product is obtained by applying a drying treatment to the powder containing the N element source while the solution containing the M element source is sprayed to the powder.

(7) The process according to any one of the above (1) to (6), wherein the lithium source is a lithium carbonate powder and the N element source is a cobalt compound powder.

(8) The process according to any one of the above (1) to (6), wherein the lithium source is a lithium carbonate powder and the N element source is a cobalt oxyhydroxide powder.

(9) A positive electrode for lithium secondary battery containing a lithium-containing composite oxide produced by the process as defined in any one of the above (1) to (8).

(10) A lithium secondary battery employing the positive electrode as defined in the above (9).

Effects of the Invention

According to the present invention, it is possible to uniformly substitute an N element being an element to be substituted by various types of M elements being substituting elements at various types of concentrations, and thus, a process is provided with excellent productivity for producing a lithium-containing composite oxide such as a lithium-cobalt composite oxide for a positive electrode of lithium secondary battery, having a large volume capacity density, high safety, excellent durability for charge/discharge cycles and low-temperature properties.

BEST MODE FOR CARRYING OUT THE INVENTION

The lithium-containing composite oxide according to the present invention, has a general formula $Li_pN_xM_yO_zF_a$. In the general formula, p, x, y, z and a are defined as described above. Among these, p, x, y, z and a are preferably as follows. $0.97 \leq p \leq 1.03$, $0.99 \leq x < 1.00$, $0.0005 \leq y$ 0.025, $1.95 \leq z \leq 2.05$, x+y=1 and $0.001 \leq a \leq 0.01$. Here, when a is larger than 0, a composite oxide a part of whose oxygen atoms is substituted by fluorine atoms, is formed, and in this case, safety of obtained cathode active material improves.

The N element is at least one type of element selected from the group consisting of Co, Mn and Ni, and among these, Co, Ni, a combination of Co and Ni, a combination of Mn and Ni or a combination of Co, Ni and Mn is preferred.

The M element is at least one type of element selected from the group consisting of aluminum, an alkali earth metal and a transition metal element other than N element. Here, the transition metal element means a transition metal of Group 4, 5, 6, 7, 8, 9, 10 or 11. Among these, M element is preferably at least one element selected from the group consisting of Zr, Hf, Ti, Nb, Ta, Mg, Cu, Sn, Zn and Al. Particularly, from the viewpoints of e.g. capacity development property, safety and cycle durability, Zr, Hf, Ti, Mg or Al is preferred.

With respect to an N element source to be employed in the present invention, when the N element is cobalt, the N element source is preferably cobalt carbonate, cobalt hydroxide, cobalt oxyhydroxide or cobalt oxide. Particularly, cobalt hydroxide or cobalt oxyhydroxide is preferred since they easily develop the property. Further, when the N element is nickel, the N element source is preferably nickel hydroxide or nickel carbonate. Further, when the N element is manganese, manganese carbonate is preferably employed.

Further, when the N element source is a compound containing nickel and cobalt, the compound is preferably $Ni_{0.8}Co_{0.2}OOH$, $Ni_{0.8}Co_{0.2}(OH)_2$, etc., when the N element source is a compound containing nickel and manganese, the compound is preferably $Ni_{0.5}Mn_{0.5}OOH$, etc., and when the N element source is a compound containing nickel, cobalt and manganese, the compound is preferably $Ni_{0.4}Co_{0.2}Mn_{0.4}(OH)_2$ or $Ni_{1/3}Co_{1/3}Mn_{1/3}OOH$, etc.

The lithium source to be employed in the present invention is preferably lithium carbonate or lithium hydroxide. Particularly, lithium carbonate is preferred since it is inexpensive. The fluorine source is preferably a metal fluoride, particularly preferably LiF or $MgF_2$, etc.

For production of the lithium-containing composite oxide according to the present invention, a solution containing M element source, preferably an aqueous solution containing M element source is employed. In this case, the M element source may be an inorganic salt such as an oxide, a hydroxide, a carbonate or a nitrate; an organic salt such as an acetate, an oxalate, a citrate, a lactate, a tartarate, a malate or a malonate; an organic metal chelate complex; or a compound produced by stabilizing a metal alkoxide by e.g. a chelate. Among these, in the present invention, the M element source is preferably one uniformly soluble in aqueous solution, such as a carbonate, a nitrate, an acetate, an oxalate, a citrate, a lactate, a tartarate, a malate, a malonate or a succinate. Particularly, a citrate or a tartarate is more preferred since they have high solubility.

As the solution containing M element source, a solution containing one or at least two types of compounds having at least two carboxylic group(s) or hydroxyl group(s) in total in its molecule, is preferably employed for stabilizing the solution. When at least two carboxylic groups are present or hydroxyl group(s) is present in addition to carboxylic group(s), solubility of M element in the solution can be increased, such being more preferred. Particularly, a molecular structure containing 3 to 4 carboxylic groups and/or a molecular structure containing 1 to 4 hydroxyl group(s) in addition to carboxylic group(s), can increase the solubility, such being further preferred.

The number of carbon atoms of the compound having at least two carboxylic group(s) or hydroxyl group(s) in total in its molecule, is preferably from 2 to 8. The number of carbon atoms is particularly preferably from 2 to 6. The compound whose molecule having at least two carboxylic group(s) and/ or hydroxyl group(s) in total in is its molecule is specifically preferably citric acid, tartaric acid, oxalic acid, malonic acid, malic acid, racemic acid, lactic acid, ethylene glycol, propylene glycol, diethylene glycol, triethylene glycol, dipropylene glycol, polyethylene glycol, butanediol or glycerin. Particularly, citric acid, tartaric acid or oxalic acid is preferred since they can increase solubility of M element source and they are relatively inexpensive. When a carboxylic acid having high degree of acidity such as oxalic acid is employed, if pH of an aqueous solution is less than 2, an N element source to be admixed later is easily solved, and thus, it is preferred to admix a base such as an ammonium to make the pH at least 2 and at most 12. If pH exceeds 12, the N element source becomes soluble, such being undesirable.

Further, in the solution containing M element source, the concentration of the compound having at least two carboxylic group(s) or hydroxyl group(s) in total is preferably high for the reason that the medium needs to be removed by drying in a subsequent step. However, if the concentration is too high, the viscosity becomes high, and it becomes difficult to uniformly blend the solution with another element source powder forming a cathode active material, and thus, the concentration is preferably from 1 to 30 wt %, particularly preferably from 4 to 20 wt %.

In the present invention, as an N element source and an M element source, a product produced by impregnating a solution containing M element source in a powder containing N element source and drying them, is employed. As means for producing such a dried product, various types of methods may be employed. For example, a method of immersing a powder containing N element source in a solution containing M element source followed by drying them, or a method of spraying a solution containing M element source to a powder containing N element source while they are subjected to a drying treatment, is preferably employed. In this case, for example, such means may be employed, in which a powder containing N element source is blended by a biaxial kneader, an aqueous solution containing M element source is sprayed, and a wet powder thus obtained containing M element source and N element source is dried by e.g. a spray dry method or a shelf stage drying method to remove moisture. For the drying, generally, e.g. an axial mixer, a drum mixer or a turbulizer may also be employed.

In the present invention, a dried product being an N element source and an M element source obtained in the method described above, is blended with another element source, dried and fired to produce a lithium-containing composite oxide. In this case, it is preferred that by such means as the following (A), (B) or (C), while a solution containing M element source is sprayed to a powder containing N element source, they are blended with another element source, dried and subsequently, thus obtained blended product is fired.

(A) While an N element source, and a fluorine source as the case requires, is blended and kneaded in an apparatus having both blending and drying functions, a solution containing M element source is sprayed to them and they are blended and dried, and subsequently, a lithium source is blended with them.

(B) While an N element source, and a fluorine source as the case requires, is blended and kneaded in an apparatus having both blending and drying functions, a lithium source and a solution containing M element source are sprayed and they are blended and dried.

(C) While a lithium source, an N element source, and a fluorine source as the case requires, are blended and kneaded in an apparatus having both blending and drying functions, a solution containing M element source is sprayed and they are blended and dried.

In the above-mentioned means (A), (B) or (C), when an element source such as N element source is used in a form of powder, average particle size of the powder is not particularly limited, but in order to achieve good blending, the particle size is preferably from 0.1 to 25 µm, particularly preferably from 0.5 to 20 µm. Further, the blending ratio of element sources, is selected so as to achieve desired element ratio in the range of the above-mentioned general formula $Li_p N_x M_y O_z F_a$ of the cathode active material to be produced in the present invention.

The blending and drying of the solution containing M element source and another element source powder in such means as the above-mentioned (A), (B) or (C), are not particularly limited, but it is preferred to use an apparatus having a spray type injection function and blending and drying functions such as a Loedige mixer or a solid air apparatus, whereby uniform blending and drying can be achieved by a single step. In this case, productivity is further improved and a lithium-containing composite oxide can be easily obtained, which has appropriate particle size without having excess agglomeration or pulverization, and which contains N element in which M element is uniformly mixed and M element. Among these, as an apparatus for conducting drying treatment while spraying a solution containing M element to a powder containing N element source, for the reasons of uniformity of treated product obtained and particle control, an apparatus having a horizontal axis type mixing mechanism, a spray type injection mechanism and a heating mechanism, such as a Loedige mixer apparatus, is particularly preferred.

The temperature at a time of blending and drying a solution containing M element source with a powder of another element source in such means as the above-mentioned (A), (B) or (C), is preferably from 80 to 150° C., particularly preferably from 90 to 120° C. A solvent in a mixed product of the element sources is not necessarily completely removed in this stage since it is removed in a subsequent firing step, but in a case where the solvent is water, since a large energy is required to remove water in the firing step, water is preferably removed as much as possible.

In the present invention, the above-mentioned N element source, M element source and another element source of a lithium-containing composite oxide, are blended and dried by the above-mentioned means (A), (B) or (C) so as to achieve desired element ratio in the range of the above-mentioned general formula $Li_pN_xM_yO_zF_a$ of a cathode active material to be produced.

The dried mixed product of the element sources obtained was subsequently fired. The firing step is important in the present invention, and the step is preferably conducted in a two-stage firing or in a single-stage firing. In the case of two-stage firing, the dried blended product is subjected to a first-stage firing at from 250 to 700° C., preferably from 300 to 550° C., subsequently the fired product is subjected to a second-stage firing at from 850 to 1,100° C., preferably from 900 to 1,050° C. Further, in the case of single-stage firing, the temperature of the dried blended product is raised from 250 to 600° C. at a temperature-rising speed of at most 4° C./min, preferably at most 3° C./min, and the product is subsequently fired at from 850 to 1,100° C., preferably at from 900 to 1,050° C. The temperature-rising speed to reach each of the firing temperatures in the two-stage firing and the temperature-rising speed to reach the firing temperature of from 850 to 1,100° C. after completion of the temperature-rising of from 250 to 650° C. in the single-stage firing, may be large or small. However, from the viewpoint of production efficiency, the temperature-rising speeds are preferably from 0.1 to 20° C./min, particularly preferably from 0.5 to 10° C./min.

In the present invention, in a case of conducting a firing satisfying any one of the above conditions, a lithium-containing composite oxide having the characteristics of the present invention can be obtained even in a case of not carrying out granulating of raw material or e.g. pulverization in an intermediate stage. Accordingly, in a case of firing the dried blended product directly at from 850 to 1,100° C. without carrying out two-stage firing, or in a case of raising the temperature of the product from 250 to 600° C. at a temperature-rising speed exceeding 4° C./min, it is difficult to obtain a lithium-containing composite oxide having satisfactory performances. In the present invention, a powder of the lithium-containing composite oxide is produced by conducting a firing treatment for from 2 to 48 hours, preferably from 5 to 20 hours under the above firing conditions, and cooling obtained fired product, and subsequently pulverizing and classifying it.

The reason why a lithium composite oxide having excellent performances is obtained even in a production of industrial scale by using the above firing conditions in the present invention, is considered to be as follows. At a time of firing a blended product of inorganic lithium compound powder, an inorganic cobalt compound powder and a carboxylate at least 500° C. under an oxygen-containing atmosphere to conduct lithiation, e.g. carboxylic acid used in the production process of the present invention is burned by oxygen in the atmosphere to be converted to a carbon dioxide gas. When the amount of blended powder is little, required oxygen is supplied from the atmosphere, but in a case of firing a dried blended powder densely filled in a deep firing container, it is presumed that shortage of oxygen supplied from the outside occurs and lithiation reaction progresses in a slightly reducing atmosphere, and as a result, abnormal firing occurs.

In the firing of the present invention, when carboxylic acid is converted to carbon dioxide gas by oxygen gas, by making the reaction progress slowly, it is possible to prevent abnormal firing under the condition of shortage of oxygen. Namely, since conversion of carboxylic acid into carbon dioxide gas progresses at from 250 to 700° C., it is presumed that by raising the temperature slowly in this temperature range or by conducting a first-stage firing at from 250 to 700° C. and after completion of conversion of carboxylic acid into carbon dioxide gas, firing the material in an oxygen-containing atmosphere at from 850 to 1,100° C., it is possible to produce a desired lithium-containing composite oxide.

In the lithium-containing composite oxide obtainable by conducting firing and subsequent pulverization in the above manner, particularly in a case where N element is cobalt, the average particle size D50 is preferably from 5 to 15 μm, particularly preferably from 8 to 12 μm, and its specific surface area is preferably from 0.2 to 0.6 $m^2/g$, particularly preferably from 0.3 to 0.5 $m^2/g$. Further, an integration width of a (110) plane diffraction peak of 2θ=66.5±10 measured by a powder X-ray diffraction analysis using CuKα rays, is preferably from 0.08 to 0.140, particularly preferably from 0.08 to 0.120, and the press density is preferably from 3.05 to 3.50 $g/cm^3$, particularly preferably from 3.10 to 3.40 $g/cm^3$. In the present invention, the press density means an apparent density of a lithium-containing composite oxide powder pressed by a pressure of 0.3 $t/cm^2$.

In a case of producing a positive electrode for lithium secondary battery from the lithium-containing composite oxide, the positive electrode is produced by blending in such a composite oxide powder, a carbon type conductive material such as acetylene black, graphite or ketjen black and a binder. For such a binder, preferably, polyvinylidene fluoride, polytetrafluoroethylene, polyamide, carboxymethyl cellulose, an acrylic resin or the like is employed. The powder of lithium-containing composite oxide of the present invention, a conductive material and a binder are blended with a solvent or a dispersion medium to produce a slurry or a kneaded product. The slurry or the kneaded product is supported by a positive electrode current collector of e.g. an aluminum foil or a stainless steel foil by e.g. coating, to produce an electrode for lithium secondary battery.

In a lithium secondary battery employing a lithium-containing composite oxide of the present invention for a cathode active material, e.g. a film of a porous polyethylene or a porous polypropylene may be employed as a separator. Further, as the solvent of the electrolytic solution of the battery, various types of solvents may be employed, and among these, a carbonate ester is preferred. For the carbonate ester, each of a cyclic type and a chain type may be employed. As the cyclic carbonate ester, propylene carbonate, ethylene carbonate (EC) etc. may be mentioned. As the chain carbonate ester, dimethyl carbonate, diethyl carbonate (DEC), ethyl methyl carbonate (EMC), methyl propyl carbonate, methyl isopropyl carbonate etc. may be mentioned.

In the present invention, any one of the above-mentioned carbonate ester may be used alone or two or more types of them may be used as a mixture. Further, they may be used as a mixture with other solvents. Further, according to the material of the anode active material, when a chain carbonate ester and a cyclic carbonate ester are used in combination, discharge properties, cycle durability and charge/discharge efficiency can be improved in some cases.

Further, in the above-mentioned solvent for electrolytic solution, vinylidene fluoride-hexafluoropropylene copolymer (e.g. product name KYNAR manufactured by ELF Atochem) or a vinylidene fluoride-perfluoropropyl vinyl ether copolymer may be incorporated to form a gel polymer electrolyte. Electrolyte(s) to be incorporated in the above-mentioned electrolytic solution or polymer electrolyte, is preferably at least one type of lithium salt containing as anion $ClO_4^-$, $CF_3SO_3^-$, $BF_4^-$, $PF_6^-$, $AsF_6^-$, $SbF_6^-$, $CF_3CO_2^-$ or $(CF_3SO_2)_2N^-$. The amount of the electrolyte is preferably adjusted so that its concentration becomes from 0.2 to 2.0 mol/L (liter) based on the electrolytic solution or the polymer electrolyte. If the concentration deviates from this range, the ion conductivity decreases to decrease electric conductivity of the electrolyte. The concentration is particularly preferably from 0.5 to 1.5 mol/L.

In a lithium battery employing the lithium-containing composite oxide according to the present invention as the cathode active material, a material capable of absorbing and discharging lithium ion is employed as an anode active material. The material forming the anode active material is not particularly limited, and for example, lithium metal, a lithium alloy, a carbon material, a carbon compound, a silicon carbide compound, a silicon oxide compound, titanium sulfide, a boron carbide compound or an oxide containing a metal of Group 14 or 15 of Periodic Table as a main component, is mentioned. As the carbon material, one produced by thermally decomposing an organic material under various thermal decomposition conditions, an artificial graphite, natural graphite, soil graphite, exfoliated graphite, flake graphite etc. may be employed. Further, as the oxide, a compound containing tin oxide as the main component may be employed. As the negative electrode current collector, a copper foil, a nickel foil etc. is employed. Such a negative electrode is preferably produced by kneading the above-mentioned active material with an organic solvent to produce a slurry and coating a metal foil electric collector with the slurry, drying and pressing them.

The shape of the lithium battery employing the lithium-containing composite oxide obtainable by the process of the present invention as the cathode active material, is not particularly limited. The shape may be appropriately selected according to the application from e.g. a sheet shape, a film shape, a folded shape, a wounded cylindrical shape with bottom and a button shape.

EXAMPLES

Now, the present invention will be explained in further detail with reference to Examples and Comparative Examples. However, the present invention is by no means restricted to such specific Examples.

Example 1

1.97 g of commercially available magnesium carbonate powder, 2.88 g of citric acid and 133.2 g of water were blended and subsequently 1.50 g of ammonium was added to produce an aqueous solution of carboxylate of pH 9.5 in which magnesium carbonate was uniformly dissolved.

194 g of commercially available cobalt hydroxide powder (average particle size D50=15.3 μm) was put in a vat and the above-mentioned aqueous solution was added so that the powder was immersed in the aqueous solution, and they were mixed by using a blade and subsequently dried at 120° C. to obtain a dried product having a composition of $Co_{0.99}Mg_{0.01}$. The powder and 76.2 g of lithium carbonate were blended by a dry method to obtain a dried blended product (concentration of carboxylate in the dried blended product: 1.0%).

The dried blended product was put in a rectangular open vessel made of ceramics, and using a firing furnace, the temperature of the product was raised to 500° C. in the air at a temperature-rising speed of 7° C./min, and the product was subjected to a first-stage firing at 500° C. for 5 hours. Subsequently, without cracking or pulverizing the product, the temperature of the product as it was raised to 950° C. at a temperature-rising speed of 7° C./min, and thereafter, the product was subjected to a second-stage firing in the air at 950° C. for 14 hours. A fired product obtained was homogenous. Particle size distribution of a $LiCo_{0.99}Mg_{0.01}O_2$ powder produced by cracking the fired product and constituted by agglomerated primary particles, was measured by using a laser scattering type particle size distribution measurement apparatus by using water as a disperser, and as a result, the average particle size D50 was 15.5 μm. Further, the specific surface area obtained by a BET method was 0.42 m$^2$/g. Here, in the present invention, all specific surface areas were measured by using a BET method. Further, the amount of by-produced cobalt oxide was at most 0.2%.

10 g of the above-mentioned powder was dispersed in a 100 g of purified water, filtered and subjected to a potentiometric titration with HCl of 0.1N to measure the amount of remaining alkali, and as a result it was 0.02 wt %. Further, with respect to the above powder, an X-ray diffraction spectrum was obtained by an X-ray diffraction. In the powder X-ray diffraction analysis using CuKα rays, integral width of a diffraction peak of (110) plane of 2θ=66.5±10 was 0.112° and the press density was 3.20 g/cm$^3$.

The above-mentioned powder, an acetylene black and a polyvinylidene fluoride powder were blended at a weight ratio of 90/5/5, and N-methylpyrrolidone was added to produce a slurry, and one surface of an aluminum foil of 20 μm thick was coated with the slurry by using a doctor blade. The coated product was dried and rolled four times by using a roll press to produce a positive electrode sheet for lithium battery.

Further, a member produced by punching out the positive electrode sheet was employed as a positive electrode, a metal lithium foil of 500 μm thick was employed as a negative electrode, a nickel foil of 20 μm thick was employed as a negative electrode electric collector, a porous polypropylene of 25 μm thick was employed as a separator, and further, $LiPF_6$/EC+DEC (1:1) solution (It means a blended solution of EC+DEC at a weight ratio of 1:1 containing $LiPF_6$ as a solute. Hereinafter, it may be simply referred to as EC+DEC (1:1) solution.) having a concentration of 1M was employed to assemble two sets of simple sealed cell type lithium batteries made of stainless steel in an argon globe box.

With respect to a battery employing EC+DEC (1:1) solution as the above-mentioned electrolytic solution, the battery was charged to 4.3 V at a load current of 75 mA per 1 g of the cathode active material at 25° C., and the battery was discharged to 2.5 V at a load current of 75 mA per 1 g of the cathode active material, to measure the initial discharge capacity. Further, a discharge capacity ratio between 1.5 C and 0.25 C was measured. Further, from the density of the electrode layer and the capacity per weight, the volume capacity density was obtained. Further, with respect to the battery, 30 cycles of charge/discharge cycle test was subsequently carried out. As a result, the initial weight capacity density was 160 mAh/g, and the volume retention ratio after the 30 charge/discharge cycles, was 98.3%.

Further, with respect to other batteries employing EC+DED (1:1) solution as the electric solution, each of the batteries was charged at 4.3 V for 10 hours, disassembled in an argon globe box to take out a positive electrode sheet after charge, the positive electrode sheet was cleaned and punched out into a diameter of 3 mm, sealed in an aluminum capsule together with EC and heated in a scanning type differential calorimeter at a temperature-rising speed of 5° C./min to measure the heat generation starting temperature. As a result, the heat generation starting temperature of the product charged to 4.3 V was 163° C.

Example 2

1.97 g of commercially available magnesium carbonate, 3.11 g of basic aluminum lactate, 19.4 g of citric acid and 90 g of water were blended to prepare an aqueous solution, and 12.39 g of ammonium zirconium carbonate $(NH_4)_2[Zr(CO_3)_2(OH)_2]$ aqueous solution containing 15.1 wt % of Zr was added to obtain an aqueous solution containing carboxylate.

194 g of commercially available oxycobalt hydroxide powder (average particle size D50: 13.2 μm) was put in a vat, and the above-mentioned aqueous solution was added so that the powder was immersed in the aqueous solution, and they were blended by using a blade, dried at 120° C. to obtain a dried product having a composition of $Al_{0.01}Co_{0.97}Mg_{0.01}Zr_{0.01}$. The powder and 76.1 g of lithium carbonate were blended by a dry method to obtain a dried blended product (concentration of carbonate: 7.1%).

The dried blended product was put in a rectangular open vessel made of ceramics, and using a firing furnace, the temperature was raised to 400° C. in the air at a temperature-rising speed of 7° C./min, and the product was subjected to a first-stage firing at 400° C. for 5 hours. Subsequently, without cracking or pulverizing the product, the temperature of the product as it was raised to 950° C. at a temperature-rising speed of 7° C./min, and subjected to a second-stage firing at 950° C. in the air for 14 hours. A fired product obtained was homogenous.

A $LiAl_{0.01}Co_{0.97}Mg_{0.01}Zr_{0.01}O_2$ powder obtained by pulverizing the fired product was evaluated in the same manner as in Example 1, and as a result, the average particle size D50 was 13.3 μm, the specific surface area was 0.45 m²/g. The amount of by-produced cobalt oxide was at most 0.2%, and the press density was 3.15 g/cm³.

In the same manner as in Example 1, a positive electrode sheet was produced by employing the above-mentioned powder, and measured its performances as characteristics of a cathode active material of lithium secondary battery, and as a result, the initial weight capacity density at 25° C. at from 4.3 to 2.5 V was 159 mAh/g, and the capacity retention ratio after 30 charge/discharge cycles was 99.3%. Further, heat generation starting temperature of 4.3 V charged product was 170° C.

Example 3

A dried product having a composition of $Al_{0.01}Co_{0.97}Mg_{0.01}Zr_{0.01}$ was obtained in the same manner as Example 2 except that 160.4 g of commercially available tricobalt tetraoxide powder (average particle size D50: 12.2 μm) was employed instead of the cobalt oxyhydroxide. The powder and 76.1 g of lithium carbonate were blended by a dry method to obtain a dried blended product (concentration of carboxylate: 8%).

The dried blended product was put in a rectangular open vessel made of ceramics, and using a firing furnace, the temperature was raised from a room temperature to 600° C. in the air at a temperature-rising speed of 1.2° C./min. Further, the temperature was raised from 600° C. to 950° C. at a temperature-rising speed of 1.5° C./min, and thereafter, the product was fired at 950° C. for 12 hours. The fired product was homogenous.

A $LiAl_{0.01}Co_{0.97}Mg_{0.01}Zr_{0.01}O_2$ powder obtained by cracking the fired product, was evaluated in the same manner as in Example 1, and as a result, the average particle size D50 was 12.5 μm and the specific surface area was 0.44 m²/g. The amount of by-produced cobalt oxide was at most 0.2%, and the press density was 3.07 g/cm³.

In the same manner as in Example 1, a positive electrode sheet was produced by using the above-mentioned powder, and measured its performances as characteristics of a cathode active material of lithium secondary battery, and as a result, the initial weight capacity density at 25° C. at from 4.3 to 2.5 V was 159 mAh/g, and the capacity retention ratio after 30 charge/discharge cycles was 99.1%. Further, heat generation starting temperature of a 4.3 V charged product was 168° C.

Example 4

A dried product having a composition of $Ni_{0.33}Co_{0.33}Mn_{0.33}Mg_{0.01}$ was obtained in the same manner as Example 1 except that a NiCoMn coprecipitated oxyhydroxide powder (Ni/Co/Mn=1/1/1, average particle size D50: 10.3 μm) was employed instead of the cobalt hydroxide. The powder and lithium hydroxide were blended at a predetermined ratio to obtain a dried blended product (concentration of carboxylate: 1.0%).

The dried blended product was put in a rectangular open vessel made of ceramics, and using a firing furnace, the temperature of the product was raised from a room temperature to 600° C. in the air at a temperature-rising speed of 1.2° C./min. Further, the temperature of the product was raised from 600° C. to 950° C. at a temperature-rising speed of 1.5° C./min, and thereafter, the product was fired at 950° C. for 12 hours. The fired product was homogenous.

A $LiNi_{0.33}Co_{0.33}Mn_{0.33}Mg_{0.01}O_2$ powder obtained by cracking the fired product, was evaluated in the same manner as in Example 1, and as a result, the average particle size D50 was 10.2 μm, the specific surface area was 0.50 m²/g. The press density was 2.90 g/cm³.

In the same manner as in Example 1, a positive electrode sheet was produced by employing the above-mentioned powder, and measured its performances as characteristics of a cathode active material of lithium secondary battery, and as a result, the initial weight capacity density at 25° C. at from 4.3 to 2.5 V was 160 mAh/g, and the capacity retention ratio after 30 charge/discharge cycles was 98.9%. Further, the heat generation starting temperature of a 4.3 V charged product was 193° C.

Example 5

158 g of commercially available aluminum lactate, 52 g of magnesium carbonate and 91 g of glyoxylic acid were dissolved in 1,000 g of water to prepare a solution, and 61 g of titanium lactate $[(OH)_2Ti(C_3H_5O_2)_2]$ aqueous solution containing 8.1 wt % of titanium was added to the solution to prepare an aqueous solution. Subsequently, 5,000 g of cobalt hydroxide was put in a Loedige mixer apparatus (manufactured by MATSUBO CORPORATION), it was stirred at 250 rpm, blended and dried at 105° C. in the apparatus while the above-mentioned aqueous solution was sprayed by a spray nozzle to be added to the cobalt hydroxide, to obtain a dried product having a composition of $Al_{0.01}Co_{0.978}Mg_{0.01}Ti_{0.002}$.

The dried product obtained and 1,997 g of lithium carbonate were blended to obtain a dried blended product (concentration of carbonate: 4.2%), and the temperature of the product was raised to 500° C. in the air at a temperature-rising speed of 7° C./min, and thereafter, the product was subjected to a first-stage firing for 5 hours. Without cracking or pulverizing the product, the temperature of the product as it was subsequently raised to 950° C. at a temperature-rising speed of 7° C./min, and the product was subjected to a second-stage firing in the atmospheric air at 950° C. for 14 hours. The press density of a $LiAl_{0.01}Co_{0.978}Mg_{0.01}Ti_{0.002}O_2$ powder obtained was 3.16 g/cm³.

In the same manner as in Example 1, a positive electrode sheet was prepared by employing the above-mentioned powder, and its performances as characteristics of a cathode active material of lithium secondary battery, were measured. As a result, the initial weight capacity density at 25° C. at from 4.3 to 2.5 V was 159 mAh/g, and the capacity retention ratio after 30 charge/discharge cycles was 98.9%, the heat generation starting temperature of a 4.3 V charged product was 167° C.

Comparative Example 1

$LiCo_{0.99}Mg_{0.01}O_2$ was synthesized in the same manner as in Example 1 except that the temperature of the material was raised from a room temperature to 950° C. at a temperature-rising speed of 6° C./min and the material was fired at 950° C. for 12 hours. Fired state of the fired powder in the firing vessel was heterogeneous. A lower layer portion of the fired powder in the vessel was sintered, but its upper layer portion was not sintered. The original weight capacity density was 154 mAh/g, and the capacity retention ratio after 30 charge/discharge cycles was 91.3%.

Comparative Example 2

$LiAl_{0.01}Co_{0.97}Mg_{0.01}Zr_{0.01}O_2$ was synthesized in the same manner as in Example 2 except that the firing temperature of the first stage was 800° C. (temperature-rising speed was 7° C./min) and the second-stage firing was carried out at 950° C. (temperature-rising speed was 7° C./min) for 12 hours. The fired state of the fired powder in the firing vessel was heterogeneous. A lower layer portion of the fired powder in the vessel was sintered, but its upper layer portion was not sintered. The initial weight capacity density was 153 mAh/g-$LiCoO_2$, and the capacity retention ratio after 30 charge/discharge cycles was 89.1%.

INDUSTRIAL APPLICABILITY

The lithium-containing composite oxide obtainable by the present invention is widely used as e.g. a cathode active material for lithium secondary battery. When the lithium-containing composite oxide is used as a positive electrode active material for a positive electrode of lithium secondary battery, a lithium secondary battery having a large volume capacity density, high safety, excellent durability for charge/discharge cycles and further, excellent low-temperature characteristics, is provided.

The entire disclosure of Japanese Patent Application No. 2005-144513 filed on May 17, 2005 including specification, claims, drawings and summary is incorporated herein by reference in its entirety.

What is claimed is:

1. A process, comprising:
i) blending and kneading a N element source in the form of a powder and optionally a fluorine source, in an apparatus,
spraying a solution comprising a M element source into the N element source powder during said blending and kneading to obtain a blend comprising N element, M element, and optionally fluorine and drying the blend, and
blending a powder comprising lithium with said blend; or ii) blending and kneading a N element source in the form of a powder and optionally a fluorine source, in an apparatus,
spraying a solution comprising a lithium source and a M element source into the N element source powder during said blending and kneading to obtain a blend comprising N element, M element, and, optionally, fluorine, and
drying said blend; or
iii) blending and kneading a lithium source, a N element source in the form of a powder, and optionally a fluorine source, in an apparatus to obtain a blend,
spraying a solution comprising a M element source into the blend during said blending and kneading to obtain a blended product comprising lithium, N element, M element, and optionally fluorine, and
drying the blended product,
to obtain a powder blended product;
firing, in an atmosphere comprising oxygen at a temperature of from 250° C. to 700° C., said powder blended product to produce a first-stage fired product; and
firing said first-stage fired product a second time at a temperature ranging from 950° C. to 1,100° C. to produce the lithium-containing composite oxide represented by

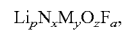

wherein $0.9 \leq p \leq 1.2$, $0.97 \leq x < 1.00$, $0 < y \leq 0.03$, $1.9 \leq z \leq 2.2$, $x+y=1$ and $0 \leq a \leq 0.02$;

and
wherein N is at least one element selected from the group consisting of Co, Mn and Ni;
M is at least one element selected from the group consisting of Zr, Hf, Ti, Nb, Ta, Mg, Cu, Sn, Zn and Al; and
the M element solution comprises at least one of citric acid, tartaric acid, and oxalic acid.

2. The process of claim 1, wherein the first-stage fired product is not pulverized before it is subjected to the second-stage firing.

3. The process of claim 1, wherein said solution comprising the M element source comprises between 1 and 30 wt % of the at least one M element source.

4. The process of claim 1, wherein said powder blended product comprises 0.1 to 10 mass % of said citric acid, tartaric acid or oxalic acid.

5. The process of claim 1, wherein said solution comprising the M element source comprises between 4 and 20 wt % of the at least one M element source.

6. The process of claim 1, wherein the lithium source is a lithium carbonate powder and the N element source is a cobalt compound powder.

7. The process of claim 1, wherein the lithium source is a lithium carbonate powder and the N element source is a cobalt oxyhydroxide powder.

8. A positive electrode for lithium secondary battery comprising a lithium-containing composite oxide produced by the process of claim 1.

9. A lithium secondary battery comprising the positive electrode as defined in claim 8.

10. The process of claim 1, wherein said compound is citric acid.

11. The process of claim 1, wherein said compound is tartaric acid.

12. The process of claim 1, wherein said compound is oxalic acid.

13. The process of claim 1, wherein said M element solution comprises a fluorine source and the lithium-containing composite oxide is represented by $Li_pN_xM_yO_zF_a$, wherein $0.9 \leq p \leq 1.2$, $0.97 \leq x < 1.00$, $0 < y \leq 0.03$, $1.9 \leq z \leq 2.2$, $x+y=1$ and $0.001 \leq a \leq 0.02$.

14. The process of claim 1, wherein said lithium-containing composite oxide represented by $Li_pN_xM_yO_zF_a$ is selected from the group consisting of $LiCo_{0.97}Al_{0.01}Mg_{0.01}Zr_{0.01}O_2$, $LiNi_{0.33}Co_{0.33}Mn_{0.33}Mg_{0.01}O_2$, and $LiCo_{0.978}Al_{0.01}Mg_{0.01}Ti_{0.002}O_2$.

15. The process of claim 1, comprising
i) blending and kneading a N element source in the form of a powder and optionally a fluorine source, in an apparatus,
spraying a solution comprising a M element source into the N element source powder during said blending and kneading to obtain a blend comprising N element, M element, and optionally fluorine and drying the blend, and
blending a powder comprising lithium with said blend
to obtain a powder blended product.

16. The process of claim 1, comprising
ii) blending and kneading a N element source in the form of a powder and optionally a fluorine source, in an apparatus,
spraying a solution comprising a lithium source and a M element source into the N element source powder during said blending and kneading to obtain a blend comprising N element, M element, and, optionally, fluorine, and
drying said blend
to obtain a powder blended product.

17. The process of claim 1, comprising
iii) blending and kneading a lithium source, a N element source in the form of a powder, and optionally a fluorine source, in an apparatus to obtain a blend,
spraying a solution comprising a M element source into the blend during said blending and kneading to obtain a blended product comprising lithium, N element, M element, and optionally fluorine, and
drying the blended product,
to obtain a powder blended product.

18. The process of claim 1, wherein said M element solution comprises a fluorine source and the lithium-containing composite oxide is represented by $Li_pN_xM_yO_zF_a$, wherein $0.97 \leq p \leq 1.03$, $0.99 \leq x < 1.00$, $0.0005 \leq y \leq 0.025$, $1.95 \leq z \leq 2.05$, $x+y=1$ and $0.001 \leq a \leq 0.02$.

19. A process, comprising:
i) blending and kneading a N element source in the form of a powder and optionally a fluorine source, in an apparatus,
spraying a solution comprising a M element source into the N element source powder during said blending and kneading to obtain a blend comprising N element, M element, and optionally fluorine and drying the blend, and
blending a powder comprising lithium with said blend; or
ii) blending and kneading a N element source in the form of a powder and optionally a fluorine source, in an apparatus,
spraying a solution comprising a lithium source and a M element source into the N element source powder during said blending and kneading to obtain a blend comprising N element, M element, and, optionally, fluorine, and
drying said blend; or
iii) blending and kneading a lithium source, a N element source in the form of a powder, and optionally a fluorine source, in an apparatus to obtain a blend,
spraying a solution comprising a M element source into the blend during said blending and kneading to obtain a blended product comprising lithium, N element, M element, and optionally fluorine, and
drying the blended product,
to obtain a powder blended product;
raising the temperature of said powder blended product from 250° C. to 600° C. at a speed of at most 4° C./min;
and thereafter firing said blended product in an atmosphere comprising oxygen at a temperature of from 950° C. to 1,100° C. to produce a lithium-containing composite oxide represented by $Li_pN_xM_yO_zF_a$, wherein $0.9 \leq p \leq 1.2$, $0.97 \leq x < 1.00$, $0 < y \leq 0.03$, $1.9 \leq z \leq 2.2$, $x+y=1$ and $0 \leq a \leq 0.02$;

N is at least one element selected from the group consisting of Co, Mn and Ni;

M is at least one element selected from the group consisting of Zr, Hf, Ti, Nb, Ta, Mg, Cu, Sn, Zn, and Al; and said M element solution comprises at least one of citric acid, tartaric acid, and oxalic acid.

20. A positive electrode for lithium secondary battery comprising a lithium-containing composite oxide produced by the process of claim 19.

21. A lithium secondary battery comprising the positive electrode as defined in claim 20.

22. The process of claim 19, comprising
i) blending and kneading a N element source in the form of a powder and optionally a fluorine source, in an apparatus,
spraying a solution comprising a M element source into the N element source powder during said blending and kneading to obtain a blend comprising N element, M element, and optionally fluorine and drying the blend, and
blending a powder comprising lithium with said blend to obtain a powder blended product.

23. The process of claim 19, comprising
ii) blending and kneading a N element source in the form of a powder and optionally a fluorine source, in an apparatus,
spraying a solution comprising a lithium source and a M element source into the N element source powder during said blending and kneading to obtain a blend comprising N element, M element, and, optionally, fluorine, and drying said blend
to obtain a powder blended product.

24. The process of claim 19, comprising
iii) blending and kneading a lithium source, a N element source in the form of a powder, and optionally a fluorine source, in an apparatus to obtain a blend,
spraying a solution comprising a M element source into the blend during said blending and kneading to obtain a blended product comprising lithium, N element, M element, and optionally fluorine, and
drying the blended product,
to obtain a powder blended product.

25. The process of claim 19, wherein said M element solution comprises a fluorine source and the lithium-containing composite oxide is represented by

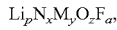

wherein $0.9 \leq p \leq 1.2$, $0.97 \leq x < 1.00$, $0 < y \leq 0.03$, $1.9 \leq z \leq 2.2$, $x+y=1$ and $0.001 \leq a \leq 0.02$.

26. The process of claim 19, wherein said M element solution comprises a fluorine source and the lithium-containing composite oxide is represented by

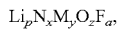

wherein $0.97 \leq p \leq 1.03$, $0.99 \leq x < 1.00$, $0.0005 \leq y \leq 0.025$, $1.95 \leq z \leq 2.05$, $x+y=1$ and $0.001 \leq a \leq 0.02$.

* * * * *